(12) United States Patent
Kim

(10) Patent No.: US 10,571,034 B2
(45) Date of Patent: Feb. 25, 2020

(54) WATER VALVE CARTRIDGE

(71) Applicant: Jong Koo Kim, Incheon (KR)

(72) Inventor: Jong Koo Kim, Incheon (KR)

(73) Assignee: Jong Koo Kim, Incheon (KR)

( * ) Notice: Subject to any disclaimer, the term of this patent is extended or adjusted under 35 U.S.C. 154(b) by 45 days.

(21) Appl. No.: 15/812,556

(22) Filed: Nov. 14, 2017

(65) Prior Publication Data

US 2018/0135765 A1    May 17, 2018

(30) Foreign Application Priority Data

Nov. 17, 2016   (KR) .......................... 10-2016-0153217

(51) Int. Cl.
*F16K 11/078* (2006.01)
*F16K 11/074* (2006.01)
*F16K 11/20* (2006.01)

(52) U.S. Cl.
CPC ...... *F16K 11/0787* (2013.01); *F16K 11/0743* (2013.01); *F16K 11/202* (2013.01)

(58) Field of Classification Search
CPC ............ F16K 11/0787; F16K 11/0782; F16K 27/045; F16K 3/08; F16K 19/006; F16K 11/0743; F16K 11/0746; E03C 2201/30; Y10T 137/86815; Y10T 137/86847; Y10T 137/9464
USPC ................................ 137/801, 625.4, 625.44
See application file for complete search history.

(56) References Cited

U.S. PATENT DOCUMENTS

| | | | | |
|---|---|---|---|---|
| 4,653,538 A * | 3/1987 | Tsutsui | ................ | F16K 11/0746 137/597 |
| 7,143,786 B2 * | 12/2006 | Romero | .................... | F16K 3/08 137/606 |
| 7,905,424 B2 * | 3/2011 | Li | ....................... | F16K 11/0743 137/625.4 |

FOREIGN PATENT DOCUMENTS

KR       101039709       6/2011
KR     1020170117777   10/2017

* cited by examiner

*Primary Examiner* — Michael R Reid
(74) *Attorney, Agent, or Firm* — IP & T Group LLP

(57) ABSTRACT

A water valve cartridge includes an operation disk which is provided in an assembly space between a cartridge base and a cartridge housing and adjusts degrees of opening and closing of an introduction passage and a discharge passage according to a rotational state so as to adjust an amount of water flow and a water temperature, wherein a cold water introduction hole and a hot water introduction hole which are introduction passages of water supplied from an external source and a plurality of discharge holes which are discharge passages of the introduced water have different rotation radii and are located on the same plane and the operation disk individually opens and closes the cold and hot water introduction holes and the plurality of discharge holes by a separate rotational operation in a state of being stacked in a surface-to-surface manner at a position corresponding to the different rotation radius.

7 Claims, 13 Drawing Sheets

WATER VALVE CARTRIDGE

CROSS-REFERENCE TO RELATED APPLICATION

The present application claims priority of Korean Patent Application No. 10-2016-0153217, filed on Nov. 17, 2016, which is incorporated herein by reference in its entirety.

TECHNICAL FIELD

The following description relates to a water valve cartridge, and more specifically, to a water valve cartridge including a plurality of operation disks stacked atop one another with a structure for introduction and discharge of cold/hot water (cold water, hot water, or mixed water) and passage selection, which enables adjustment of flow amount and temperature of water and opening and closing of cold/hot water, while selectively discharging or supplying the water to a corresponding place of use through a plurality of independent passages, and while the operation disks are rotating by rotational operations of a flow-amount/passage adjusting member and a water temperature adjusting member.

RELATED ART

In general, a water valve is a valve adopted to open or close tab water (including hot water through a boiler) supplied from an external source, adjust an amount of the tap water, and select cold water or hot water or mix them to adjust water temperature. The water valve is usually installed on an upper part of a sink in a kitchen or installed in a bathroom (including bathhouse) and enables use of water through operation as necessary.

As such a water valve, there are a rotary-type water valve in which adjusting of water amount and selection of the cold/hot water or mixing of the water and thereby adjusting of the water temperature is carried out by turning of a knob, and lever-type water valve in which the water amount is adjusted by raising or lowering of the lever and selection of the cold/hot water or mixing of the water and thereby adjusting water temperature is carried out by rightward or leftward turning of the lever.

Korean Patent Registration No. 1039709 (titled "Water Valve" filed on Oct. 20, 2008, hereinafter, referred to as "prior art patent 1") discloses an example of the conventional water valve.

The conventional water valve will be described with reference to the publication of prior art patent 1 (a case will be described as a basic state of ordinary times that a selection hole 131 of the selection/mixing disk 130 is positioned so that the selection hole opens the both of a cold water hole 121 and a hot water hole 122 of a separation/introduction disk 120).

In the state as described above, both of the cold water and the hot water are introduced, and water thus obtained by mixing of the cold water and the hot water is introduced into a central mixing hole 132 of the selection/mixing disk 130 and guided to a discharge hole 141 of the discharge disk 140. Depending on the open and closed states of the cold/hot water holes 121 and 122 of the separation/introduction disk 120 and the selection hole 131 of the selection/mixing disk 130, the cold water or the hot water or the mixed water (water temperature-adjusted) is guided to the discharge hole 141 of the discharge disk 140, or blocking surface of the blocking/path selection disk 150, namely the surface other than the direct water path guide hole 151 and the shower path guide hole 152 blocks the discharge hole 141, therefore the water is not discharged out of the valve cartridge 100.

At this point, if the blocking/path selection disk 150 is rotated leftward, that is to say, the direct water path guide hole 151 is aligned with a discharge hole 141 of the discharge disk 140, the water is discharged to the direct water path and the flow amount discharged to the direct water path is adjusted according to the ratio of the aligned area. Conversely, if the blocking/path selection disk 150 is rotated rightward, that is to say, the shower path guide hole 152 is aligned with the discharge hole 141 of the discharge disk 140, the water is discharged to the direct water path, as shown in FIG. 9 of the attached drawings, and the flow amount discharged to the direct water path is adjusted according to the ratio of the aligned area.

In this way, in the prior art of the same applicant, if the direct water path or the shower path is selected by the rotational operation of the blocking/path selection disk 150, the water is injected and discharged through a direct water path 161 or a shower path 162 formed in a flow amount-adjusting member 160 to the corresponding injection hole of an outlet port 12, namely a direct water hole 12a or a shower hole 12b.

However, the prior art patent 1 provides a structure in which the direct water and the shower path are provided in a single body, and thus compatibility with a typical water valve for bathroom in which a faucet and a shower hose are separated from each other is lacking, so the improvement is needed.

An example of technologies most recently proposed in order to solve the above-mentioned drawback is Korean Patent Application No. 10-2016-0045608 (titled "Operation Disk for Water Valve Cartridge", filed on Apr. 14, 2016, hereinafter referred to as "prior art patent 2").

The prior art patent 2 will be described with reference to FIGS. 1 and 2 of the accompanying drawings, in which the adjustment of flow amount and temperature and opening and closing of cold and hot water are performed by turning of a knob and water is discharged through a plurality of independent discharge paths in a state in which a plurality of operation disks having structures for introduction and discharge of hot/cold water and path selection are stacked atop one another in a single water valve cartridge.

More specifically, in the prior art patent 2, the operation disk of the water valve cartridge includes: a fixing disk 210 including cold and hot water introduction holes 211 and 212 provided at intervals on the same rotation line and discharge holes 213 segmented into three parts provided at intervals at a different rotation radius from those of the cold and hot water introduction holes 211 and 212; a distribution disk 220 having an integration hole 221 aligned with forming paths of the cold and hot water introduction holes 211 and 212 and discharge holes 223 segmented into three parts which are respectively aligned with the three-segmented discharge holes 213; a water temperature adjustment disk 230 having a water temperature adjustment hole 231 which allows some or all of the cold and hot water introduction holes 211 and 212 to communicate with the integration hole 221 while rotating between the fixing disk 210 and the distribution disk 220 and a communication hole 233 which allows the three-segmented discharge holes 213 to communicate with the discharge holes 223 regardless of a rotation angle; and a flow-amount/passage adjustment disk 240 which includes an open cut-out portion 241 and a blocking surface to open one of the discharge holes 223 or block all of the discharge holes while rotating in a state of being stacked on a portion of one surface of the distribution disk 220 where the discharge holes 223 are formed.

In the operation disk 200 of the prior art patent 2, sealing is maintained by an elastic pressure of packing 1 P1 in a state in which a lower surface of the fixing disk 210 is partially accommodated in a cartridge base 110; a lower surface of the water temperature adjustment disk 230 is stacked in close surface contact with an upper surface of the fixing disk 210; a lower surface of the distribution disk 220 is stacked in close surface contact with an upper surface of the water temperature adjustment disk 230, wherein a fixing protrusion 182 provided on a lower outer edge portion of a blocking bush 180 is fitted into a fixing groove provided on an outer edge portion of an upper surface of the distribution disk 220, packing 2 P2 provided on a lower inner edge portion of the blocking bush 180 maintains sealing by elastically pressing an inner edge portion of the upper surface of the distribution disk 220; the flow-amount/passage adjustment disk 240 is stacked in close surface contact with a central portion of the distribution disk 220, wherein the flow-amount/passage adjustment disk 240 is rotated while being coupled to a fitting projected piece 161 of a lower end of the flow-amount/passage adjusting member 160 and being brought into close contact in a direction toward the distribution disk 220 by an elastic pressing force of packing 3 P3.

However, according to the prior art patent 2 as described above, the packing 1 P1 provides a pressing force to the fixing disk 210 and the pressing force applied to the fixing disk 210 is fully applied to the water temperature adjustment disk 230, and in addition to this pressing force, the pressing force of the packing 2 P2 provided between the blocking bush 180 and the distribution disk 220 and the pressing force of the packing 3 P3 provided between the flow-amount/passage adjusting member 160 and the flow-amount/passage adjustment disk 240 are simultaneously applied to the water temperature adjustment disk 230, and consequently, the water temperature adjustment disk 230 receives the severe pressing forces from above and below and hence a frictional resistance is increased, which causes a problem of a tight rotational operation.

More specifically, when it is assumed that the elastic pressing force of the packing 1 P1 which is applied from the lower portion of the fixing disk 210 to the water temperature adjustment disk 230 through the fixing disk 210 is 100, the elastic pressing force of the packing 2 which is applied from the upper portion of the distribution disc 220 to the water temperature adjustment disk 230 through the distribution disc 220 is 50, and the elastic pressing force of the packing 3 P3 which is applied from the upper portion of the flow-amount/passage adjustment disk 240 to the water temperature adjustment disk 230 through the flow-amount/passage adjustment disk 240 and the distribution disc 220 is 30, the elastic pressing force applied to the water temperature adjustment disk 230 is a total of 180.

As described above, when the elastic pressing force of 180 is applied to the water temperature adjustment disk 230, a problem of a tight rotational operation due to an increased frictional resistance may occur.

In addition, since the fixing disk 210, the water temperature adjustment disk 230 and the distribution disk 220 are brought into close contact with each other over a large area so that the frictional resistance of portions in contact with each other is increased and thus a rotational operation is tightly performed, that is, the rotational operation becomes hard.

Moreover, according to the prior art patent 2, the three-segmented discharge holes 213 are formed on the fixing disk 210 in order to distribute water to various places of use (e.g., direct water, washing machine, etc.) so that an opened area of the discharge holes 213 is formed to be narrow when compared to a conventional two-segmented discharge hole (e.g., discharge hole for introducing water in a direction of shower or sink), and consequently, the flow amount of water to be discharged is small or water pressure becomes lower.

To solve the above drawbacks, diameters of the operation disks need to be expanded to compensate for the narrowed opened area of the discharge holes 213. However, when the diameters of the operation disks are expanded, the overall size of a faucet is also increased and a problem with compatibility with a main body of a general faucet may arise due to the increased diameter of the water valve cartridge.

Furthermore, according to the prior art patent 2 as described above, a stacked structure is provided in which a plurality of operation disks 200 are stacked atop one another, that is, the water temperature adjustment disk 230 is stacked on the upper portion of the fixing disk 210, the distribution disk 220 is stacked on the upper portion of the water temperature adjustment disk 230 and the flow-amount/passage adjustment disk 240 is stacked on the distribution disk 220. Therefore, not only the number of disks is large but also the overall height of the disk stack is high, so that a length of the water valve cartridge 100 becomes long and, accordingly, the height of the faucet is increased, which results in increase in size as a whole.

DETAILED DESCRIPTION OF THE INVENTION

Technical Problem to Be Solved

The present invention is devised in view of the drawbacks or improvements of the prior art, and the objective of the present invention is to provide a water valve cartridge including a plurality of operation disks stacked atop one another with a structure for introduction and discharge of cold/hot water (cold water, hot water, mixed water) and passage selection, which enables adjustment of flow amount and temperature of water and opening and closing of cold/hot water by selectively discharging or supplying the water to a corresponding place of use through a plurality of independent passages while the operation disks are rotating by rotational operations of a flow-amount/passage adjusting member and a water temperature adjusting member, wherein the water valve cartridge minimizes an elastic pressing force of a packing applied to the operation disks, particularly, a water temperature adjustment disk, and at the same time reduces a friction area, thereby minimizing a frictional resistance, and also secures the an area of a maximum water discharge passage within limited diameters (in a state of no diameter expansion) of the operation disks and decreases the rates of water flow of the operation disks.

Technical Solution of the Invention

According to one aspect, there is provided a water valve cartridge 10 including an operation disk 20 which is provided in an assembly space between a cartridge base 11 and a cartridge housing 10 and adjusts degrees of opening and closing of an introduction passage and a discharge passage according to a rotational state so as to adjust an amount of water flow and a water temperature, wherein a cold water introduction hole 21-1 and a hot water introduction hole 21-2 which are introduction passages of water (cold water and hot water) supplied from an external source and a plurality of discharge holes 21-3 which are water discharge passages have different rotation radii (located at different positions on the concentric circle) and are located on the same plane and the operation disk individually opens and closes the cold and hot water introduction holes 21-1 and 21-2 and the plurality of discharge holes 21-3 through a separate rotational operation in a state of being stacked in a surface-to-surface manner at a position corresponding to the different rotation radius.

The operation disk 20 of the present invention may include: a fixing disk 21 in a circular shape which is provided with the cold and hot water introduction holes 21-1 and 21-2 at intervals on a part of the same rotation line and is also provided with the plurality of discharge holes 21-3 and a blocking portion, which are spaced apart from each other, at a different rotation radius from those of the cold and hot water introduction holes 21-1 and 21-2; a rotary water temperature adjustment disk 23 provided with a water temperature adjustment hole 23-1 for opening or closing the cold and hot water introduction holes 21-1 and 21-2 by a rotational operation in a state of being in close contact with the fixing disk 21; and a rotary flow-amount/passage adjustment disk 24 provided with an open cut-out portion 24-1 and a blocking surface for selectively opening and closing the plurality of outlet-holes 21-3 by a separate rotational operation in a state of being in close contact with the fixing disk 21 on a horizontal plane of the water temperature adjustment disk 23.

In addition, the operation disk 20 may include: a fixing disk 21 in a circular shape which is provided with the cold and hot water introduction holes 21-1 and 21-2 at intervals on a part of the same rotation line and is also provided with the plurality of discharge holes 21-3 and a blocking portion spaced apart from each other at a different rotation radius from those of the cold and hot water introduction holes 21-1 and 21-2; a rotary water temperature adjustment disk 23 provided with a water temperature adjustment hole 23-1 for opening and closing the cold and hot water introduction holes 21-1 and 21-2 by a rotational operation in a state of being in close contact with the fixing disk 21; a fixed space disk 22 which secures a space for water flowing from the cold and hot water introduction holes 21-1 and 21-2 to stay therein while maintaining the rotation of the water temperature adjustment disk 23 by providing a pressure thereto; and a rotary flow-amount/passage adjustment disk 24 provided with an open cut-out portion 24-1 and a blocking surface for selectively opening and closing the plurality of discharge holes 21-3 by a separate rotational operation in a state of being in close contact with the fixing disk 21 on a horizontal plane of the water temperature adjustment disk 23.

In this case, in the operation disk 20, sealing may be maintained by an upward elastic pressing force of packing 1 P1 in a state in which a lower portion of the fixing disk 21 is partially accommodated in the cartridge base 11; a lower portion of the water temperature adjustment disk 23 may be stacked in close contact with an upper portion of the fixing disk 21; a lower portion of the space disk 22 may be stacked in close contact with an upper portion of the fixing disk 21, wherein a downward elastic pressing force of packing 2 P2 provided on an inner edge of a lower end of a blocking bush 18 provides a contacting force in a direction of the water temperature adjustment disk 23; a lower portion of the flow-amount/passage adjustment disk 24 may be stacked in close contact with the upper portion of the fixing disk 21 at a different rotation radius from that of the water temperature adjustment disk 23, wherein a lower portion of a flow-amount/passage adjusting member 16 is coupled with an upper portion of the flow-amount/passage adjustment disk 24 and a downward elastic pressing force of packing 3 P3 provided between the flow-amount/passage adjusting member 16 and the flow-amount/passage adjustment disk 24 provides a contacting force in a direction of the fixing disk 21.

The fixing disk may include the cold and hot water introduction holes 21-1 and 21-2 provided at intervals on an outer edge or a central portion and the plurality of discharge holes provided at intervals on ¾ of the central portion or the outer edge, except for a quarter-division surface.

The water temperature adjustment disk may be an angle-limited rotary disk provided with the water temperature adjustment hole which allows communication with some or all of the cold and hot water introduction holes 21-1 and 21-2 by a rotational operation in a state of being stacked on an outer edge or a central part of the upper portion of the fixing disk.

The flow-amount/passage adjustment disk 24 of the operation disk 20 may be an angle-unlimited rotary disk stacked on the center or an outer edge of the upper portion of the fixing disk 21.

Effects of the Invention

According to the present invention, a structure is constructed in which the water temperature adjustment disk 23 and the flow-amount/passage adjustment disk 24, at a different rotation radius, are stacked in close surface contact with an upper portion of the fixing disk 21, or the water temperature adjustment disk 23 and the flow-amount/passage adjustment disk, at a different rotation radius, are stacked in close surface contact with the upper portion of the fixing disk 21 and the fixed space disk 22 is stacked in close surface contact with an upper portion of the water temperature adjustment disk 23, wherein in a state in which an upward elastic pressing force applied by packing 1 P1 located below the fixing disk 21 is attenuated by a downward elastic pressing force applied by packing 3 P3 located above the flow-amount/passage adjustment disk 24, only a downward elastic pressing force applied by packing 2 P2 located above the space disk 22 is added to be transmitted to the water temperature adjustment disk 23 so that a contacting pressure is significantly reduced, as compared to the prior art in which the elastic pressing forces of all of the above-mentioned packings are transmitted to the water temperature adjustment disk 23, and thus improvement of operability may be achieved which allows easy rotational operation of the water temperature adjustment disk 23.

In addition, according to the present invention, the water temperature adjustment disk 23 is formed as a rim-type disc, so that a frictional resistance against the fixing disk 21 is reduced and the improvement of operability, which allows smooth rotational operation, is achieved.

Moreover, according to the present invention, the plurality of discharge holes 21-3 are formed at intervals on ¾ of the central surface of the fixing disk 21, except for the quarter-division surface, that is, a blocking portion is formed on a quarter surface (90-degree surface), the first discharge hole 21-3a is formed on another quarter surface (another 90-degree surface), the second discharge hole 21-3b is formed on still another quarter surface (another 90-degree surface), and the third discharge hole 21-3c is formed on the last quarter surface (the last 90-degree surface). Accordingly, the opened area of the discharge holes 21-3 may be increased without expanding diameters of the operation disks, as compared to the discharge hole 21-3 (at an angle of 60 degrees) of the prior art (prior art document 2), so that the discharge is performed without reducing an flow amount of water discharged or a hydraulic pressure with respect to the flow amount of water introduced.

Further, as described above, the diameters of the operation disks do not need to be expanded in order to increase the opened area of the discharge holes 21-3, and hence compatibility may be achieved, which makes it possible for the water valve cartridge to be applied to an existing faucet without changing the size thereof.

DETAILED DESCRIPTION OF THE INVENTION

Hereinafter, the present invention will be described below with reference to the accompanying drawings.

Figure 1:
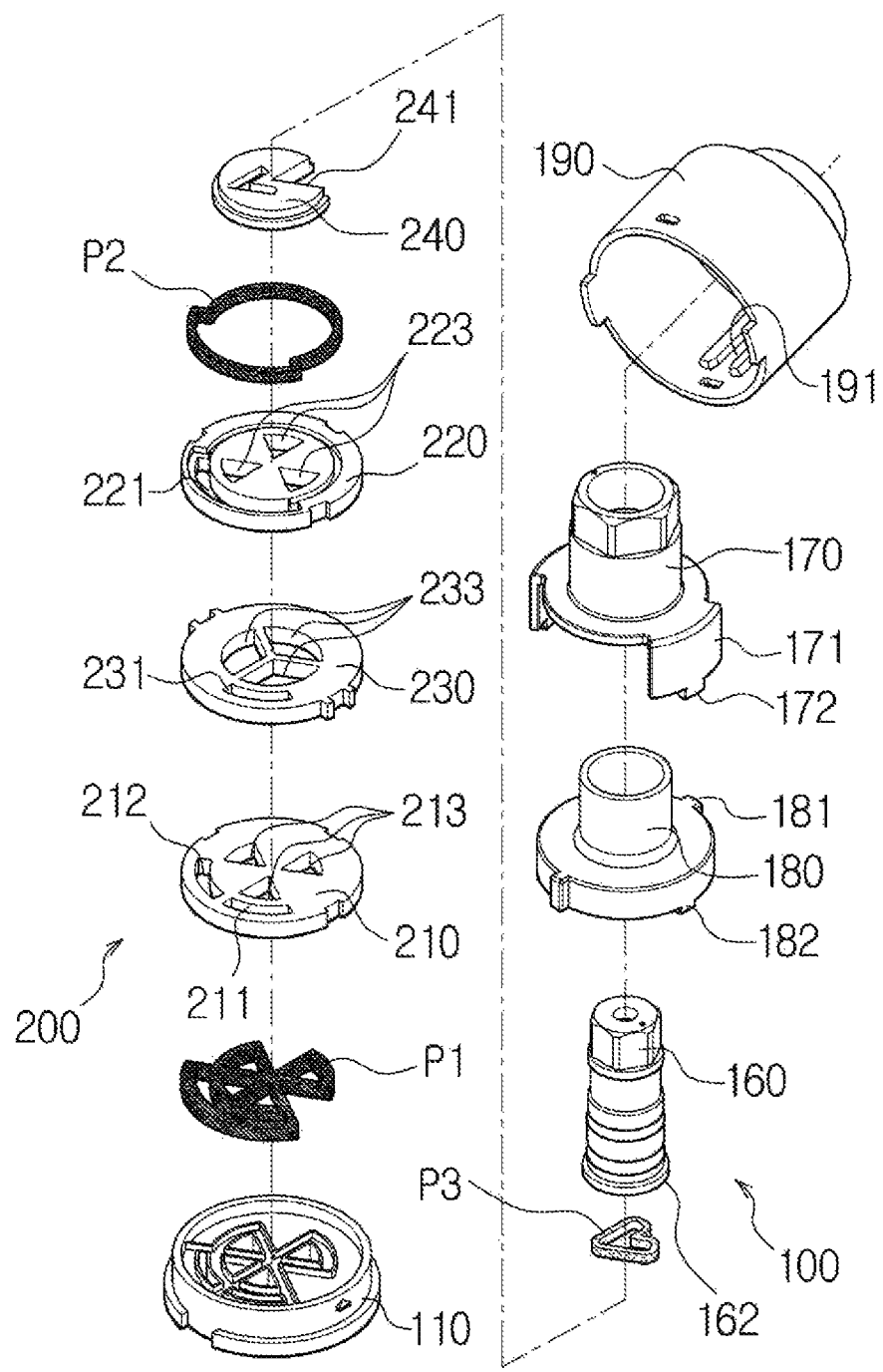
FIG. 1 is an exploded perspective view of a configuration of a conventional water valve cartridge (previously applied by the same applicant).
Figure 2:
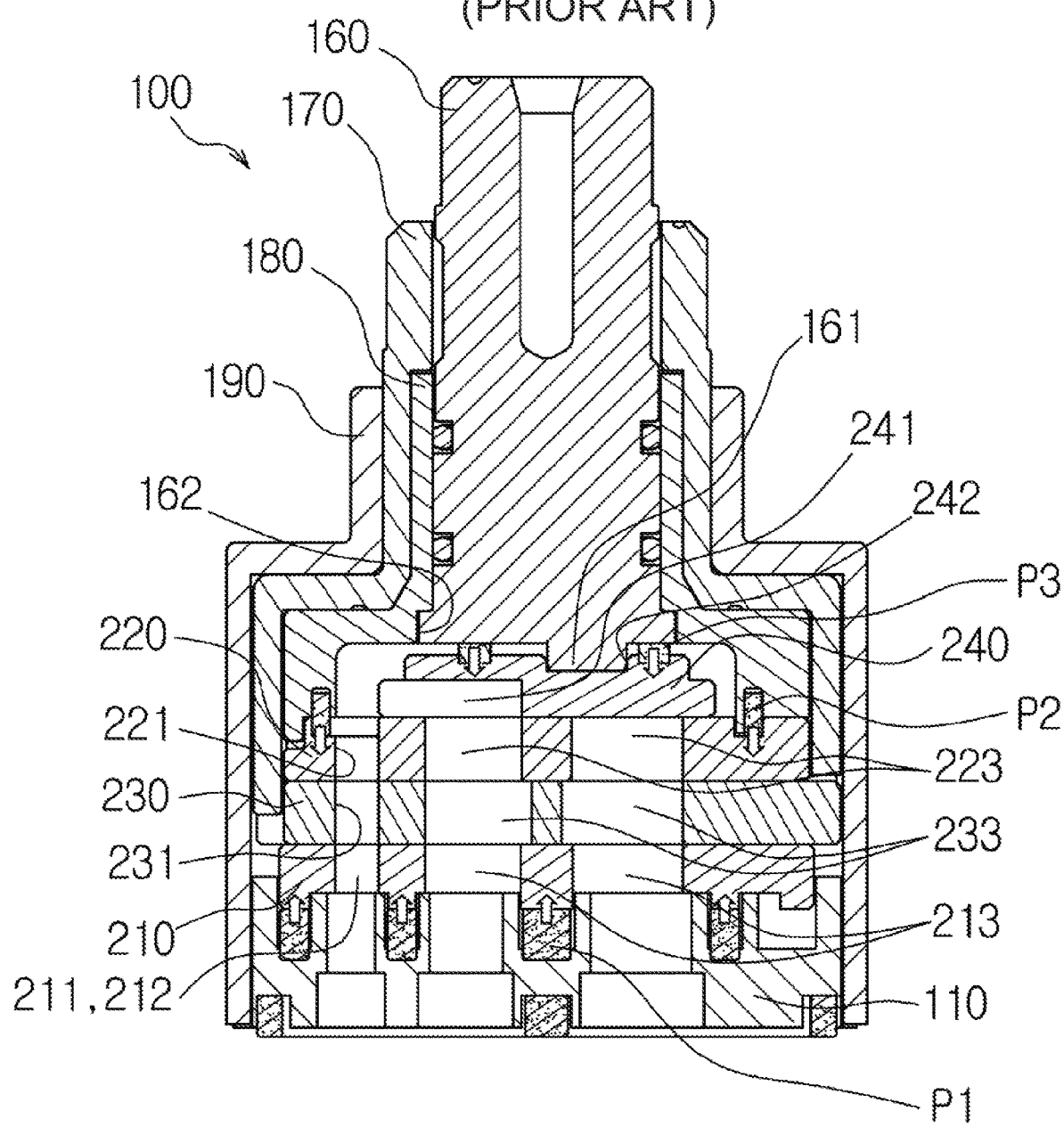
FIG. 2 is a cross-sectional view illustrating the configuration of the conventional water valve cartridge in more detail.
Figure 3:
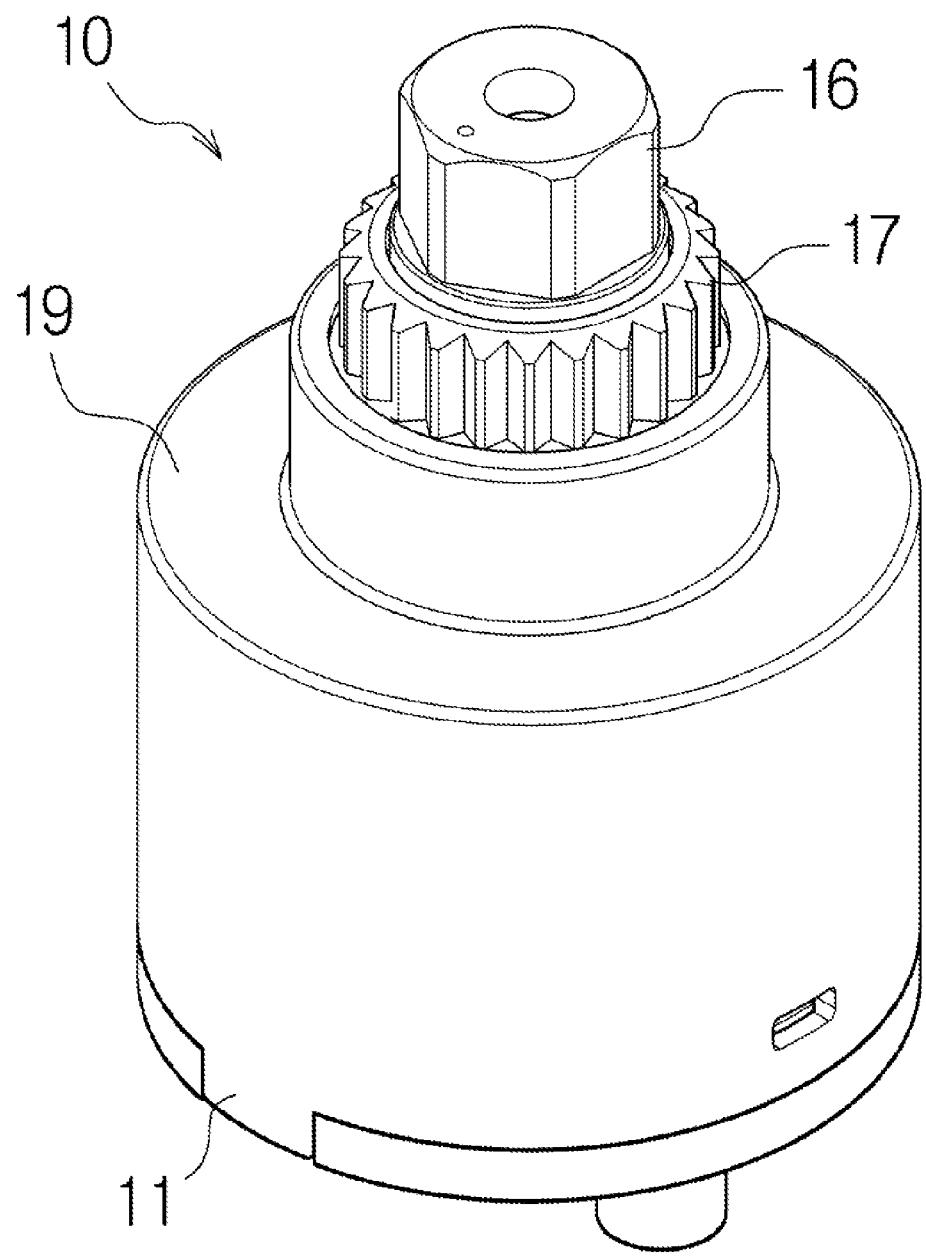
FIG. 3 is a perspective view showing an appearance of a water valve cartridge of the present invention.
Figure 4:
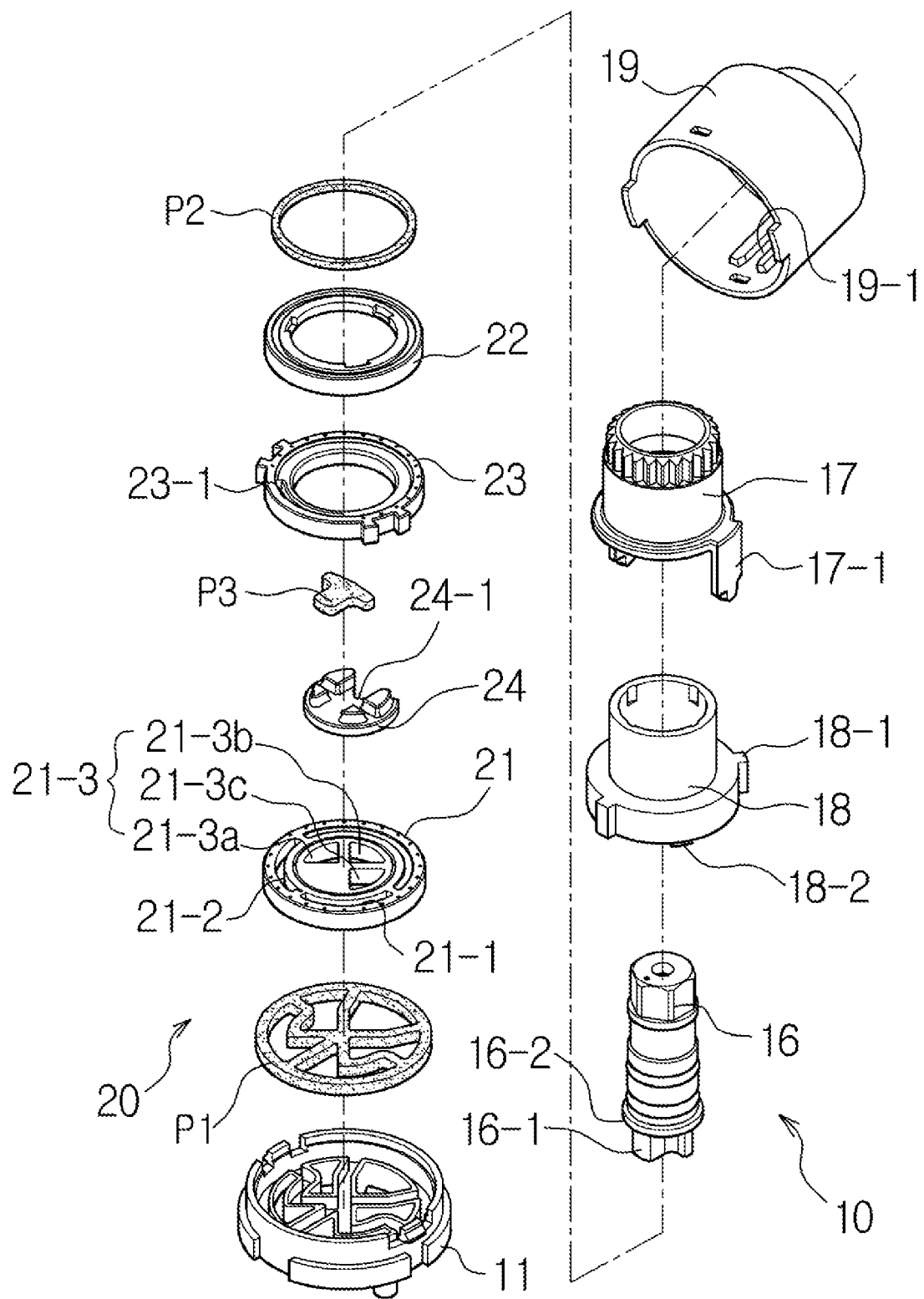
FIG. 4 is an exploded perspective view illustrating the configuration of the water valve cartridge of the present invention in more detail.
Figure 5:
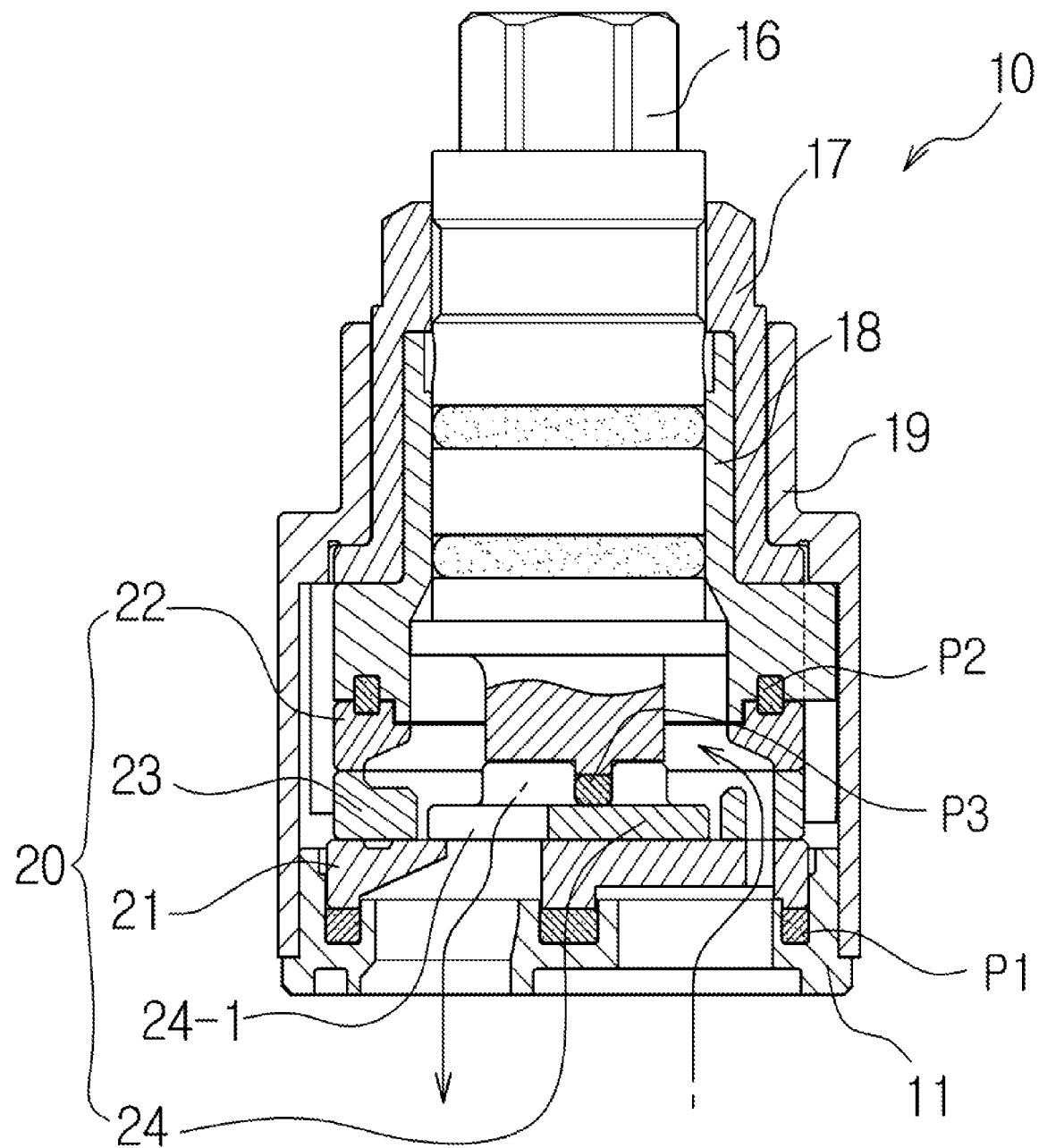
FIG. 5 is a cross-sectional view showing an assembled state of the water valve cartridge of the present invention in more detail.

First, as shown in FIGS. 3 to 5, the present invention provides a water valve cartridge 10 including an operation disk 20 which is provided in an assembly space between a cartridge base 11 and a cartridge housing 10 and adjusts degrees of opening and closing of an introduction passage and a discharge passage according to a rotational state so as to adjust an amount of water flow and a water temperature, wherein a cold water introduction hole 21-1 and a hot water introduction hole 21-2 which are introduction passages of water (cold water and hot water) supplied from an external source and a plurality of discharge holes 21-3 which are water discharge passages have different rotation radii (located at different positions on the concentric circle) and are located on the same plane and the operation disk individually opens and closes the cold and hot water introduction holes 21-1 and 21-2 and the plurality of discharge holes 21-3 through a separate rotational operation in a state of being stacked in a surface-to-surface manner at a position corresponding to the different rotation radius.

Figure 6:
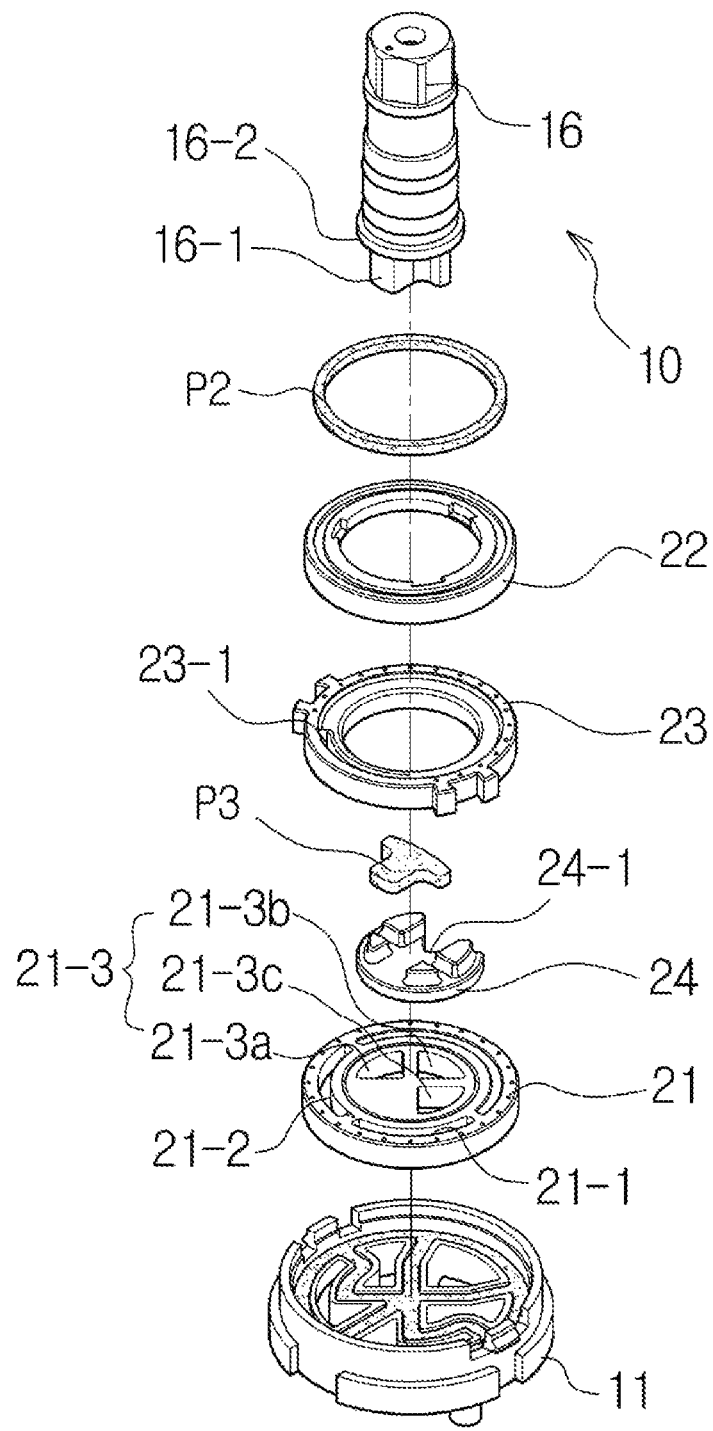
FIG. 6 is a partial cross-sectional perspective view clearly showing a state in which operation disks of the present invention are stacked atop one another.

Here, as shown in FIG. 6, the operation disk 20 of the present invention may include: a fixing disk 21 in a circular shape which is provided with the cold and hot water introduction holes 21-1 and 21-2 at intervals on a part of the same rotation line and is also provided with the plurality of discharge holes 21-3 and a blocking portion, which are spaced apart from each other, at a different rotation radius from those of the cold and hot water introduction holes 21-1 and 21-2; a rotary water temperature adjustment disk 23 provided with a water temperature adjustment hole 23-1 for opening or closing the cold and hot water introduction holes 21-1 and 21-2 by a rotational operation in a state of being in close contact with the fixing disk 21; and a rotary flow-amount/passage adjustment disk 24 provided with an open cut-out portion 24-1 and a blocking surface for selectively opening and closing the plurality of discharge holes 21-3 by a separate rotational operation in a state of being in close contact with the fixing disk 21 on a horizontal plane of the water temperature adjustment disk 23.

In addition, the operation disk 20 may include: a fixing disk 21 in a circular shape which is provided with the cold and hot water introduction holes 21-1 and 21-2 at intervals on a part of the same rotation line and is also provided with the plurality of discharge holes 21-3 and a blocking portion spaced apart from each other at a different rotation radius from those of the cold and hot water introduction holes 21-1 and 21-2; a rotary water temperature adjustment disk 23 provided with a water temperature adjustment hole 23-1 for opening and closing the cold and hot water introduction holes 21-1 and 21-2 by a rotational operation in a state of being in close contact with the fixing disk 21; a fixed space disk 22 which secures a space for water flowing from the cold and hot water introduction holes 21-1 and 21-2 to stay therein while maintaining the rotation of the water temperature adjustment disk 23 by providing a pressure thereto; and a rotary flow-amount/passage adjustment disk 24 provided with an open cut-out portion 24-1 and a blocking surface for selectively opening and closing the plurality of discharge holes 21-3 by a separate rotational operation in a state of being in close contact with the fixing disk 21 on a horizontal plane of the water temperature adjustment disk 23.

In addition, in the operation disk 20, sealing may be maintained by an upward elastic pressing force of packing 1 P1 in a state in which a lower portion of the fixing disk 21 is partially accommodated in the cartridge base 11; a lower portion of the water temperature adjustment disk 23 may be stacked in close contact with an upper portion of the fixing disk 21; a lower portion of the space disk 22 may be stacked in close contact with an upper portion of the fixing disk 21, wherein a downward elastic pressing force of packing 2 P2 provided on an inner edge of a lower end of a blocking bush 18 provides a contacting force in a direction of the water temperature adjustment disk 23; a lower portion of the flow-amount/passage adjustment disk 24 may be stacked in close contact with the upper portion of the fixing disk 21 at a different rotation radius from that of the water temperature adjustment disk 23, wherein a lower portion of a flow-amount/passage adjusting member 16 is coupled with an upper portion of the flow-amount/passage adjustment disk 24 and a downward elastic pressing force of packing 3 P3 provided between the flow-amount/passage adjusting member 16 and the flow-amount/passage adjustment disk 24 provides a contacting force in a direction of the fixing disk 21.

The cold and hot water introduction holes 21-1 and 21-2 on the fixing disk 21 of the above-described operation disk 20 may be arc-shaped long holes, each having an angle of 90 degrees or less, and be provided at intervals on an outer circumference of the fixing disk 21, wherein the total sum of all the angles is 180 degrees or less, or the cold and hot water introduction holes 21-1 and 21-2 may be arc-shaped long holes each having an angle of 180 degrees or less, wherein the total sum of all the angles is 360 degrees or less. The plurality of discharge holes 21-3 may include a first discharge hole 21-3a, a second discharge hole 21-3b, and a third discharge hole 21-3c which are in a fan shape or a trapezoidal shape having an angle of 90 degrees or less and are provided at intervals on ¾ of a central portion of the fixing disk 21, except for a quarter-division surface of the central portion.

In addition, the cold and hot water introduction holes 21-1 and 21-2 on the fixing disk 21 of the above-described operation disk 20 may be fan-shaped or semicircular shaped through-holes, each having an angle of 90 degrees or less, and be provided at intervals on a central portion of the fixing disk 21, wherein the total sum of all the angles is 180 degrees or less, or the cold and hot water introduction holes 21-1 and 21-2 may be fan-shaped or semicircular shaped through-holes, each having an angle of 180 degrees or less, wherein the total sum of all the angles is 360 degrees or less. The plurality of discharge holes 21-3 may include a first discharge hole 21-3a, a second discharge hole 21-3b, and a third discharge hole 21-3c which are in an arc-shape having an angle of 90 degrees or less and are provided at intervals on ¾ of the outer edge portion of the fixing disk 21, except for a quarter-division surface.

In this case, the fixing disk 21 may be accommodated in a cartridge base 11 which forms, together with a cartridge housing 19, forms a main body of the water cartridge 10, which will be described below, and may be fixed in a state in which sealing is maintained while an elastic pressing force is applied through packing 1 P1.

The cold and hot water introduction holes 21-1 and 21-2 may be through-holes equally divided on a part of the same rotation line.

In addition, the plurality of discharge holes 21-3 may be through-holes formed at different angles or areas which are spaced apart from each other and the blocking portion at a different rotation radius from those of the cold and hot water introduction holes 21-1 and 21-2.

Meanwhile, the water temperature adjustment disk 23 of the above-described operation disk 20 may be an angle-limited rotary disk provided with the water temperature adjustment hole 23-1 which induces inflow of cold water, hot water, or mixed water by selectively or proportionally opening or closing either or both of the cold and hot water introduction holes 21-1 and 21-2 by a rotational operation in a state of being stacked on an outer edge or a central part of an upper portion of the fixing disk 21.

The water temperature adjustment disk 23 may be a rim-type disc.

In this case, the water temperature adjustment hole 23-1 may be an arc-shaped long hole formed on a surface of the rim. In some embodiments, an angle of the arc formed by the water temperature adjustment hole 23-1 may be 90 degrees or less, but the angle may be greater than 90 degrees depending on the angles formed by the cold and hot water introduction holes 21-1 and 21-2 of the fixing disk 21.

In addition, a contacting portion between the water temperature adjustment disk 23 and the fixing disk 21 may be a flat surface, an upper surface may be downwardly inward stepped, and a groove or a projection to be coupled with a water temperature adjusting member 17 may be provided at an outer edge of the water temperature adjustment disk 23.

Moreover, the flow-amount/passage adjustment disk 24 of the above-described operation disk 20 may be an angle-unlimited rotary disk which is stacked on the center or an outer edge of the upper portion of the fixing disk 21 and includes an open cut-out portion 24-1 and a blocking surface to open one of the discharge holes 21-3 or close all of the discharge holes 21-3.

The open cut-out portion 24-1 is a fan-shaped or trapezoidal shaped cut-out portion and the angle thereof may be equal to or smaller than an angle formed by the discharge holes 21-3 of the fixing disk 21.

In addition, an upper surface of the flow-amount/passage adjustment disk 24 may be provided with a groove or a projection to be coupled with the flow-amount/passage adjusting member 16.

Further, the space disk 22 of the above-described operation disk 20 may be a rim-type fixing disk and be stacked on an upper surface of the water temperature adjustment disk 23 to maintain the rotation of the water temperature adjustment disk 23 located between the fixing disk 21 and the space disk 22 and to secure a space for water flowing from the cold and hot water introduction holes 21-1 and 21-2 to stay therein.

For reference, the water valve cartridge 10 of the present invention may include: the flow-amount/passage adjusting member 16 which has one end connected to a one side of the flow-amount/passage adjustment disk 24 and the other end exposed to an outside of an upper end of the cartridge housing 19 that forms the main body of the water valve cartridge 10 so as to unlimitedly rotate an angle of the flow-amount/passage adjustment disk 24 by operating a knob connected to the other end; the water temperature adjusting member 17 which is inserted between the cartridge housing 19 and the flow-amount/passage adjusting member 16 and has one end fastened to one side of the water temperature adjustment disk 23 and the other end exposed to the outside of the upper end of the cartridge housing 19 so as to rotate the water temperature adjustment disk 23 by operating a knob coupled to the other end; the blocking bush 18 having one end fastened to one side of the space disk 22 to form a sealed space with the space disk 22 and the other end to support the rotation of the flow-amount/passage adjusting member 16 in a state of being in close contact with a part of an outer circumferential surface of one side of the flow-amount/passage adjusting member 16; and the cartridge housing 19 fastened to the cartridge base 11 to provide an accommodating space for the operation disk 20 and limit an angle of rotation of the water temperature adjusting member 17.

In the above description, the flow-amount/passage adjusting member 16 may be provided at one end with an inserting projected piece 16-1 to be inserted into an insertion groove of the flow-amount/passage adjustment disk 24 and be provided on an outer circumferential surface of the end, at which the inserting projected piece 16-1 is provided, with a protrusion 162 for preventing dislocation from a protrusion on a lower inner diameter of the blocking bush 18.

Meanwhile, the water temperature adjusting member 17 may be a pipe that is rotated and operated by being inserted into the flow-amount/passage adjusting member 16 in a concentric manner while being isolated from the flow-amount/passage adjusting member 16 by the blocking bush 18, and have a side extension 17-1 which is bent and extends in a direction of the water temperature adjustment disk 23 while a part of one end is extended bilaterally symmetrically, and a projection on the end of the side extension 17-1 may be fitted into a groove formed on an outer circumferential surface of the water temperature adjustment disk 23.

By doing so, the rotational operation is performed without interfering with the flow-amount/passage adjusting member 16, and an angle of the rotation of the side extension 17-1 is restricted by projected pieces 19-1 protruding from an inner surface of the cartridge housing 19 so as to rotate bilaterally within a specific angle and rotate the water temperature adjustment disk 23 fastened to one end thereof.

Meanwhile, the blocking bush 18 may have, at an outer circumferential surface of one side end thereof, fixing projections 18-1 which are inserted into a pair of projected pieces 19-1 vertically formed on both sides of the inner surface of the cartridge housing 19 so as to prevent the blocking bush 18 from moving, and may have, at an end surface of one side, a fixing protrusion 18-2 to be fitted into a groove of one side edge portion of the space disk 22.

In the meantime, the cartridge housing 19 may be a two-stage tubular body which becomes narrower from bottom to top in its cross section.

The operations of the present invention configured as described above are described below.

Figure 7:
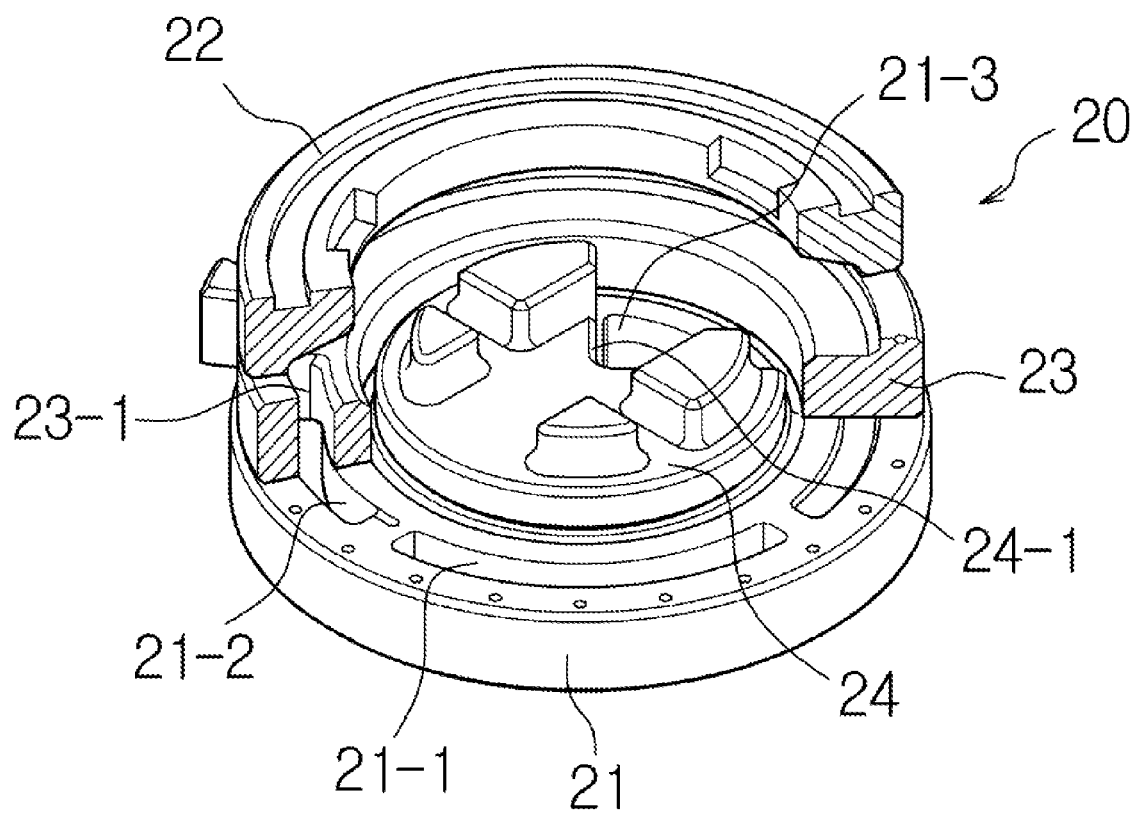
FIG. 7 is a partial cross-sectional perspective view showing a state in which the operation disks of the present invention are stacked atop one another.
Figure 8:
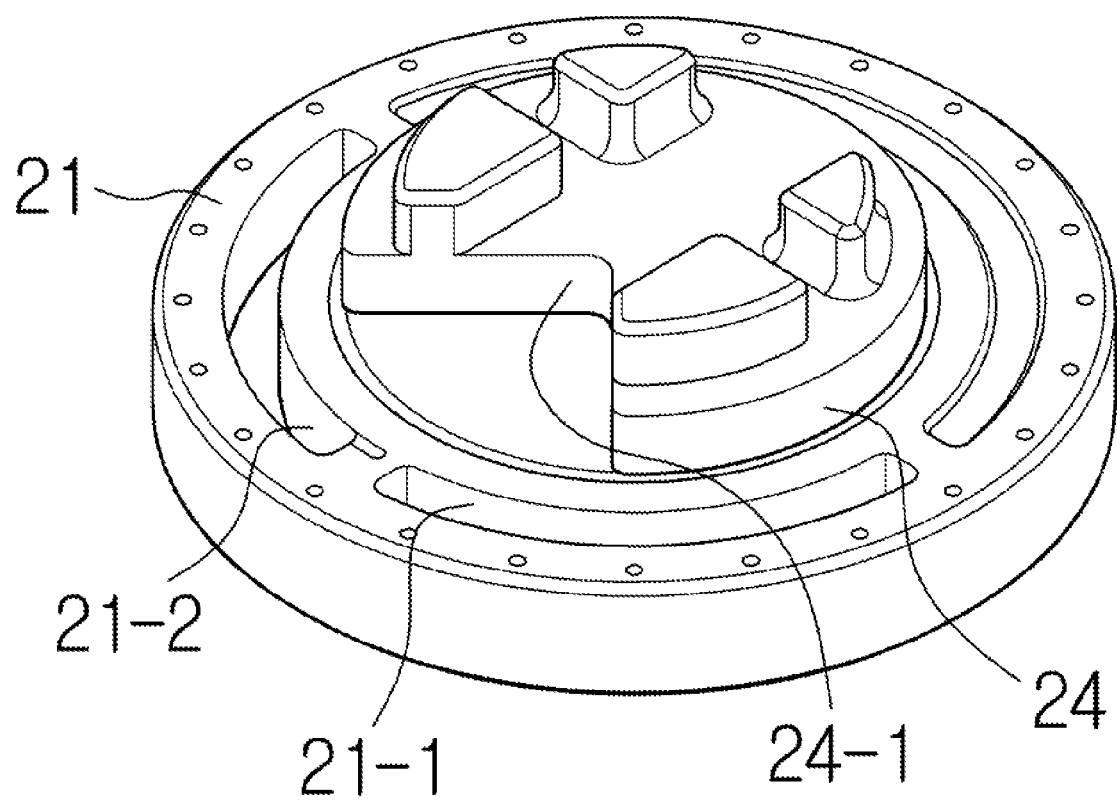
FIG. 8 is a perspective view showing a state in which a flow-amount/passage adjustment disk is stacked on a fixing disk of the present invention.

First, as shown in FIG. 7, in the operation disk 20 applied to the water valve cartridge 10 of the present invention, the rim-type water temperature adjustment disk 23 is stacked on an outer edge portion of an upper surface of the fixing disk 21 in a circular shape, and the flow-amount/passage adjustment disk 24 is stacked on the central portion of the fixing disk 21 in a state in which the rim-type space disk 22 is stacked on the upper surface of the water temperature adjustment disk 23 or the blocking bush 18 (sealing with the water temperature adjustment disk is maintained by packing) is coupled to the upper surface of the water temperature adjustment disk 23 without the space disk 22 being stacked on the water temperature adjustment disk 23. In particular, in the present invention, the flow-amount/passage adjustment disk 24 is stacked on the central portion of the upper surface of the fixing disk 21 in a surface-to-surface manner. That is, the cold and hot water introduction holes 21-1 and 21-2 are opened and closed on the upper surface of the fixing disk 21 by the water temperature adjustment disk 23, and the opening and closing of the discharge holes 21-3 are performed by the flow-amount/passage adjustment disk 24.

Sealing is maintained by an upward elastic pressing force of packing 1 P1 in a state in which the lower portion of the fixing disk 21 of the operation disk 20 is partially accommodated in the cartridge base 11; a lower portion of the water temperature adjustment disk 23 is stacked in close contact with the upper portion of the fixing disk 21; the lower portion of the space disk 22 is stacked in close contact with the upper portion of the fixing disk 21, wherein a downward elastic pressing force of packing 2 P2 provided on the inner edge of the lower end of the blocking bush 18 provides a contacting force in a direction of the water temperature adjustment disk 23; the lower portion of the flow-amount/passage adjustment disk 24 is stacked in close contact with the upper portion of the fixing disk 21 at a different rotation radius from that of the water temperature adjustment disk 23, wherein the lower portion of the flow-amount/passage adjusting member 16 is coupled with the upper portion of the flow-amount/passage adjustment disk 24 and a downward elastic pressing force of packing 3 P3 provided between the flow-amount/passage adjusting member 16 and the flow-amount/passage adjustment disk 24 provides a contacting force in a direction of the fixing disk 21.

Figure 9:
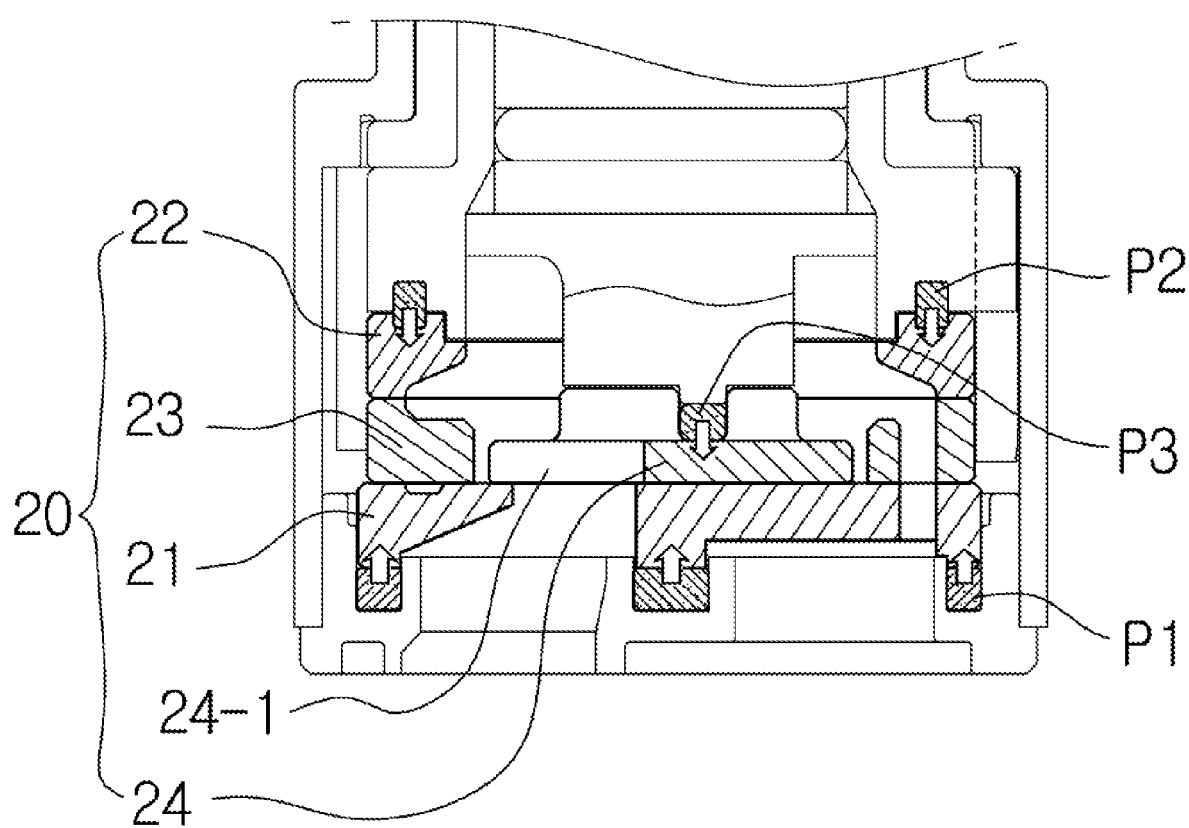
FIG. 9 is a partial cross-sectional view showing a state in which elastic pressing forces of packings are applied to corresponding operation disks of the present invention.

In the present invention as described above, as shown in FIG. 9, in a state in which the upward elastic pressing force applied by the packing 1 P1 located below the fixing disk 21 is attenuated by the downward elastic pressing force applied by the packing 3 P3 located above the flow-amount/passage adjustment disk 24, only the downward elastic pressing force applied by the packing 2 P2 located above the space disk 22 is added to be transmitted to the water temperature adjustment disk 23 so that a contacting pressure is significantly reduced, as compared to the prior art in which the elastic pressing forces of all of the above-mentioned packings are transmitted to the water temperature adjustment disk 23, and thus it is possible to easily operate the rotation of the water temperature adjustment disk 23.

More specifically, when it is assumed that the elastic pressing force of the packing 1 P1 which is applied from the lower portion of the fixing disk 21 to the water temperature adjustment disk 23 through the fixing disk 21 is 100, the elastic pressing force of the packing 2 P2 which is applied from the upper portion of the space disk 22 to the water temperature adjustment disk 23 through the space disk 22 is 50, and the elastic force of the packing 3 P3 which is applied from the upper portion of the flow-amount/passage adjustment disk 24 to the fixing disk 210 is 30, the elastic pressing force applied to the water temperature adjustment disk 230 is supposed to be a total of 150 obtained by adding the elastic pressing force of 50 of the packing 2 P2 to the elastic pressing force of 100 of the packing 1 P1, but the packing 3 P3 provides the fixing disk 21 with the elastic pressing force of 30 in the opposite direction of the packing 1 P1, and hence a total of 120 ((100-30)+50) of the elastic pressing force is actually applied to the water temperature adjustment disk 230 so that the frictional resistance is reduced and the rotational operation is smoothly performed.

In this case, in view of the drawbacks of the prior art, when it is assumed that the elastic pressing force of the packing 1 P1 which is applied from the lower portion of the fixing disk 210 to the water temperature adjustment disk 230 through the fixing disk 210 is 100, the elastic pressing force of the packing 2 which is applied from the upper portion of the distribution disc 220 to the water temperature adjustment disk 230 through the distribution disc 220 is 50, and the elastic pressing force of the packing 3 P3 which is applied from the upper portion of the flow-amount/passage adjustment disk 240 to the water temperature adjustment disk 230 through the flow-amount/passage adjustment disk 240 and the distribution disc 220 is 30, the elastic pressing force applied to the water temperature adjustment disk 230 is a total of 180. As described above, since the elastic pressing force of 180 is applied to the water temperature adjustment disk 230, the frictional resistance is increased and thus a problem of a tight rotational operation occurs.

Figure 10:
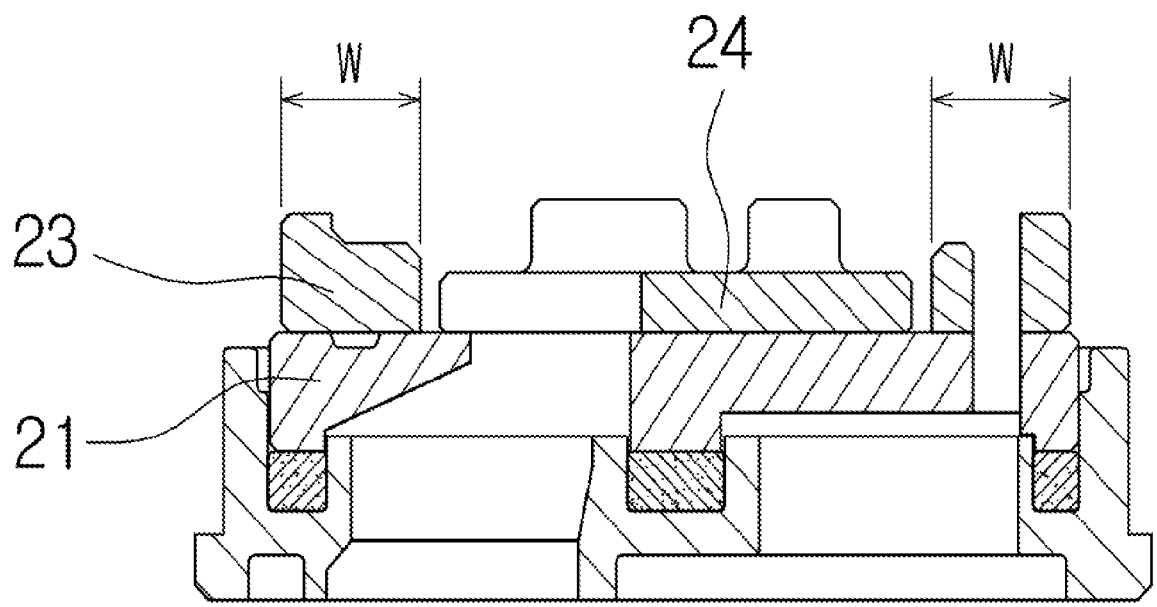
FIG. 10 is a cross-sectional view showing a width of a surface of a water temperature adjustment disk in contact with the fixing disk of the present invention.

Moreover, in the present invention, the water temperature adjustment disk 23 is of a rim type, and thus, as shown in FIG. 10, the width of a surface in contact with the fixing disk 21 may be minimized, and consequently, the frictional resistance against the fixing disk 21 is more reduced and the rotational operation is smoothly performed.

Figure 11A:
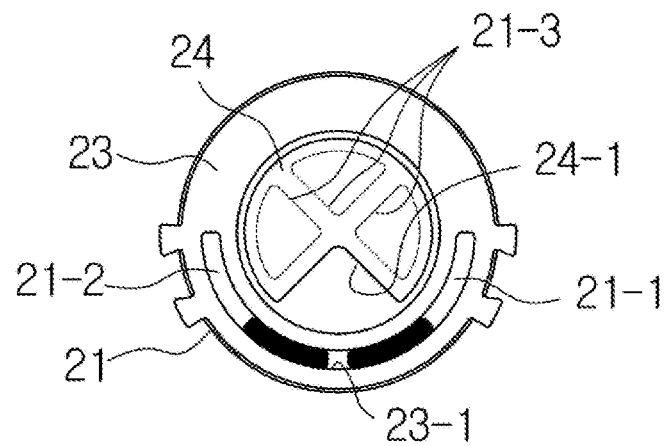
FIGS. 11*a*, 11*b*, and 11*c* are plan views showing a state in which cold water and hot water introduced to the fixing disk are adjusted by a rotational operation of the water temperature adjustment disk (discharge holes are blocked by a flow-amount/passage adjustment disk).

In the present invention as described above, as shown in FIG. 11a, when the cold and hot water introduction holes 21-1 and 21-2 of the fixing disk 21 are aligned with the water temperature adjustment hole 23-1 of the water temperature adjustment disk 23 in a state in which the water temperature adjustment disk 23 is in contact with the upper surface of the fixing disk 21, cold water and hot water supplied from an external source through the cold water introduction hole 21-1 and the hot water introduction hole 21-2 of the fixing disk 21 are introduced into a retention space formed by the space disk 24 and the blocking bush. In this case, the water is not discharged in a blocked state in which the open cut-out portion 24-1 of the flow-amount/passage adjustment disk 24 is not aligned with any of the discharge holes 21-3 of the fixing disk 21.

Figure 11B:
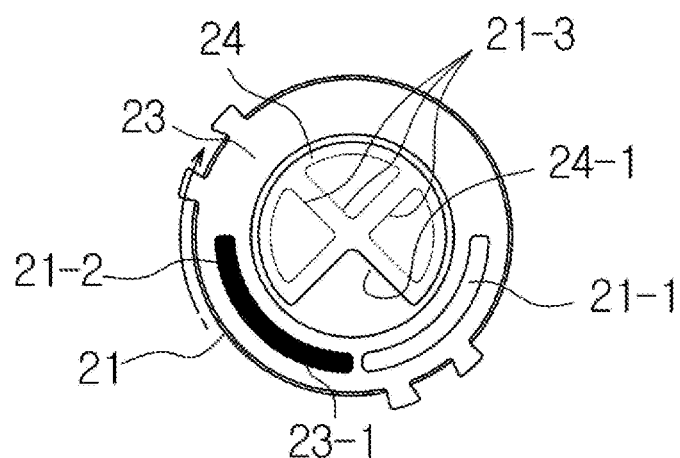

In this case, if the hot water introduction hole 21-1 of the fixing disk 21 is brought in alignment with the water temperature adjustment hole 23-1 of the water temperature adjustment disk 23 by rotating the water temperature adjustment disk 23 in the left direction, as shown in FIG. 11b, hot water supplied from the external source through the hot water introduction hole 21-1 of the fixing disk 21 is introduced into the retention space through the water temperature adjustment hole 23-1 of the water temperature adjustment disk 23. In this case, the water is not discharged in a blocked state in which the open cut-out portion 24-1 of the flow-amount/passage adjustment disk 24 is not aligned with any of the discharge holes 21-3 of the fixing disk 21.

Figure 11C:
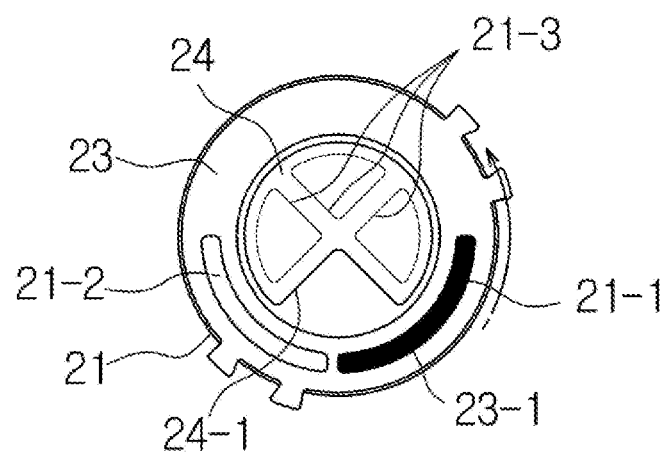

In this case, if the cold water introduction hole 21-1 of the fixing disk 21 is aligned with the water temperature adjustment hole 23-1 of the water temperature adjustment disk 23 by rotating the water temperature adjustment disk 23 in the right direction, as shown in FIG. 11c, cold water supplied from the external source through the cold water introduction hole 21-1 of the fixing disk 21 is introduced into the retention space through the water temperature adjustment hole 23-1 of the water temperature adjustment disk 23. In this case, the water is not discharged in a blocked state in which the open cut-out portion 24-1 of the flow-amount/passage adjustment disk 24 is not aligned with any of the discharge holes 21-3 of the fixing disk 21.

Figure 12A:
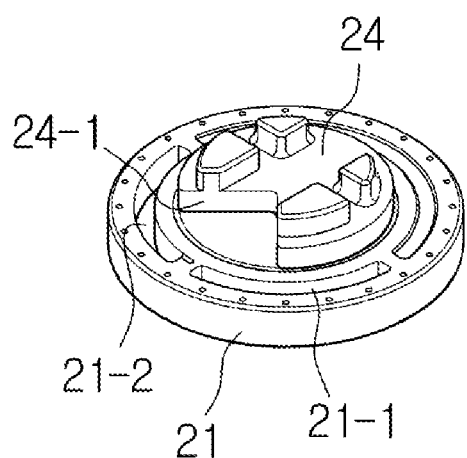
FIGS. 12*a*, 12*b*, 12*c*, and 12*d* are perspective views showing a state in which the flow-amount/passage disc blocks and selectively opens the discharge holes of the fixing disk of the present invention.
Figure 13A:
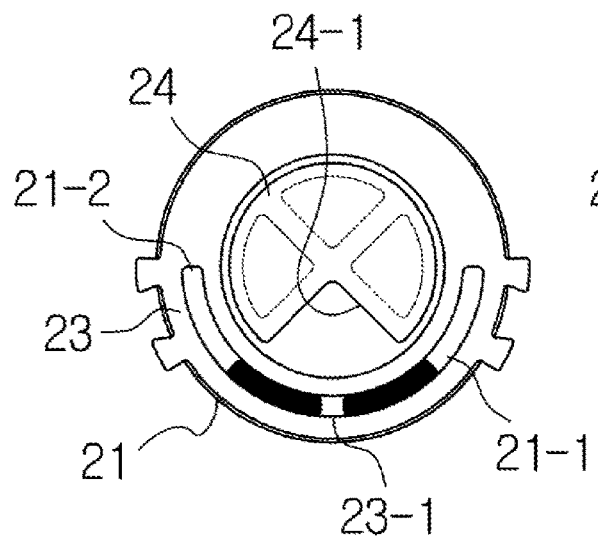
FIGS. 13*a*, 13*b*, 13*c*, and 13*d* are plan views showing a state in which the flow-amount/passage disc blocks and selectively opens the discharge holes of the fixing disk of the present invention.

As shown in FIGS. 12a and 13a, the water introduced into the retention space is not discharged in a blocked state in which the open cut-out portion 24-1 of the flow-amount/passage adjustment disk 24 is not aligned with any of the discharge holes 21-3 of the fixing disk 21.

Figure 12B:
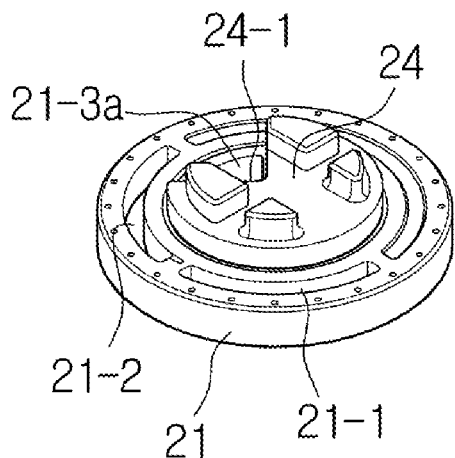
Figure 13B:
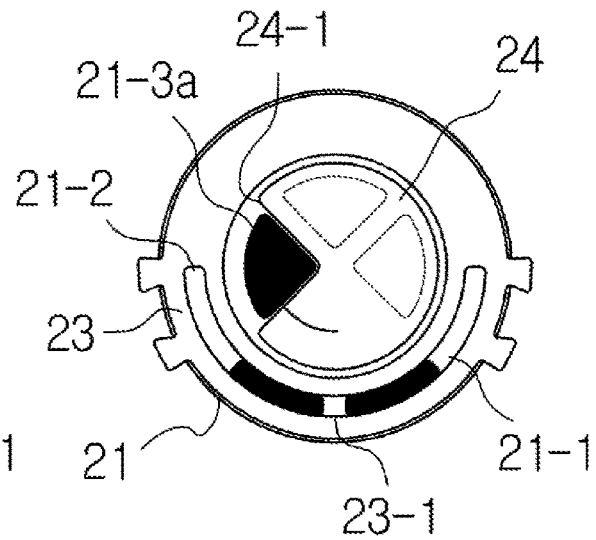

In this case, in a state in which the open cut-out portion 24-1 opens the first discharge hole 21-3a of the fixing disk 21 when the flow-amount/passage adjustment disk 24 is rotated in the left direction (rotating at 90 degrees in the blocked state), as shown in FIGS. 12b and 13b, the water is discharged through the first discharge hole 21-3a while the flow amount is adjusted according to a degree of the opening.

Figure 12C:
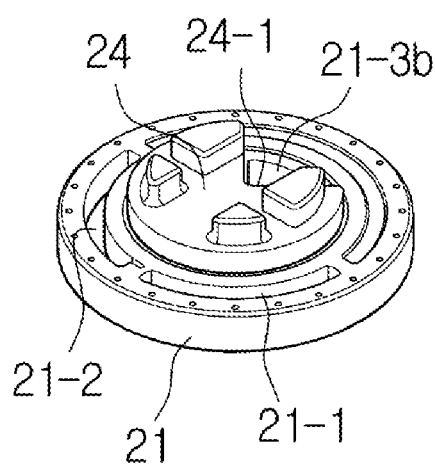
Figure 13C:
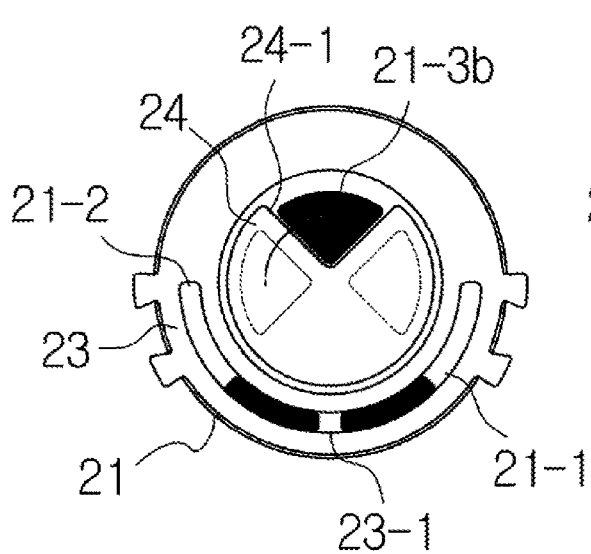

In this case, if the flow-amount/passage adjustment disk 24 is further rotated in the left direction (rotated at 180 degrees in the blocked state), as shown in FIGS. 12c and 13c and the open cut-out portion 24-1 opens the second discharge hole 21-3b, the water is discharged through the second discharge hole 21-3b while the flow amount is adjusted according to a degree of the opening.

Figure 12D:
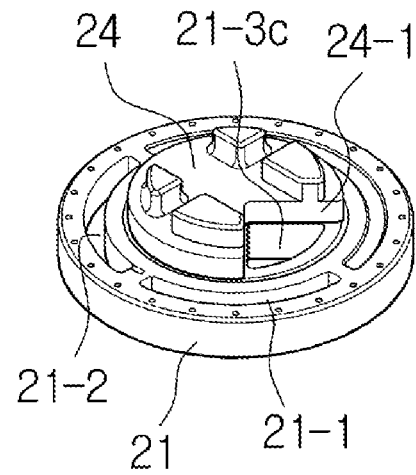
Figure 13D:
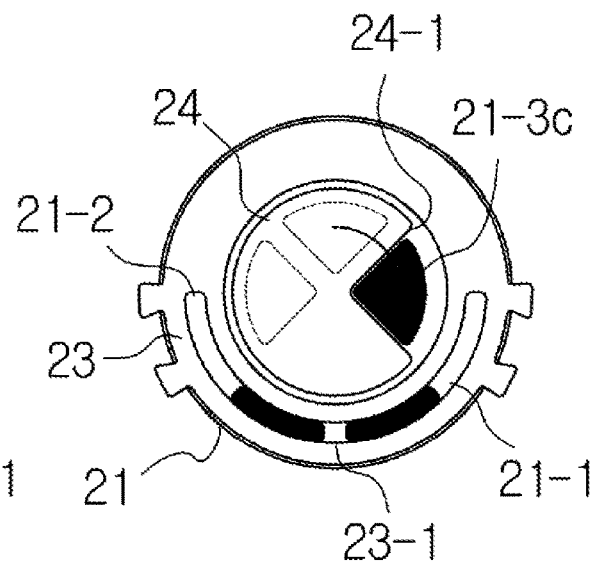

In this case, if the flow-amount/passage adjustment disk 24 is further rotated in the left direction (rotated at 270 degrees in the blocked state), as shown in FIGS. 12d and 13d and the open cut-out portion 24-1 opens the third discharge hole 21-3c, the water is discharged through the third discharge hole 21-3c while the flow amount is adjusted according to a degree of the opening.

A discharge end provided to the cartridge base 11 located at and end of the discharge hole 21-3, i.e., a bottom surface of the fixing disk 21 is connected to a faucet of a sink, a shower hose, or other objects that need water supply, and water is supplied through the discharge end.

In the present invention as described above, the plurality of discharge holes 21-3 are formed at intervals on ¾ of the central surface of the fixing disk 21, except for the quarter-division surface, that is, a blocking portion is formed on a quarter surface (90-degree surface), the first discharge hole 21-3a is formed on another quarter surface (another 90-degree surface), the second discharge hole 21-3b is formed on still another quarter surface (another 90-degree surface), and the third discharge hole 21-3c is formed on the last quarter surface (the last 90-degree surface). Accordingly, the opened area of the discharge holes 21-3 may be increased without increasing diameters of the operation disks, as compared to the discharge hole 21-3 (at an angle of 60 degrees) of the prior art, so that the discharge is performed without reducing a rate of water discharge or a hydraulic pressure with respect to the flow amount of water introduced.

In addition, as described above, the diameters of the operation disks do not need to be expanded in order to increase the opened area of the discharge holes 21-3, and hence compatibility may be achieved, which makes it possible for the water valve cartridge to be applied to an existing faucet without changing the size thereof.

Finally, each of the discharge holes 21-3 of the fixing disk 21 in the present invention may have an equal or different angle or area, as described above. That is, the discharge holes 21-3 may be divided into three equal parts (at equal angles and equal areas) or among the three discharge holes, the discharge holes related to direct water supply and shower are formed to have the equal angles and equal areas and the remaining discharge hole related to auxiliary use may be formed to be relatively small or narrow in angle or area.

In this way, the flow rate (low water pressure) for the auxiliary use may be relatively reduced in comparison with the maximum flow rate (high water pressure) of discharge holes related to direct water and shower so that water may be saved in some cases, for example, when washing fruits with lower water pressure for a long time.

Although the preferred embodiments of the present invention have been disclosed for illustrative purposes, the present invention is not limited to the construction and operation of the embodiments. For example, in the present invention, it is described that the water discharge passage is applied to three portions. However, it is possible to expand the water discharge passage to four or more portions (design four or more water outlet passages and change adjustment angles accordingly) within a range where the hydraulic pressure does not decrease.

In addition, those skilled in the art can understand that various changes and modifications can be made therein without departing from the subject matters of the disclosure.

Thus, such changes and modifications fall within the spirit and scope of the disclosure.

What is claimed is:

1. A water valve cartridge comprising: an operation disk which is provided in an assembly space between a cartridge base and a cartridge housing and adjusts degrees of opening and closing of an introduction passage and a discharge passage according to a rotational state so as to adjust an amount of water flow and a water temperature, wherein the operation disk includes:

a fixing disk in a circular shape which is provided with cold and hot water introduction holes at intervals on a part of the same rotation line and is also provided with a plurality of discharge holes and a blocking portion, spaced apart from each other, at a different rotation radius from those of the cold and hot water introduction holes;

a rotary water temperature adjustment disk provided with a water temperature adjustment hole for opening or closing the cold and hot water introduction holes by a rotational operation in a state of being in contact with the fixing disk; and a rotary flow-amount/passage adjustment disk provided with an open cut-out portion and a blocking surface for selectively opening and closing the plurality of discharge holes by a separate rotational operation in a state of being in contact with the fixing disk on a horizontal plane of the water temperature adjustment disk.

2. The water valve cartridge of claim 1, wherein the operation disk further includes a fixed space disk which secures a space for water flowing from the cold and hot water introduction holes to stay therein while maintaining the rotation of the water temperature adjustment disk by providing a pressure thereto.

3. The water valve cartridge of claim 1, wherein in the operation disk, sealing is maintained by an upward elastic pressing force of a first packing in a state in which a lower portion of the fixing disk is partially accommodated in the cartridge base; a lower portion of the water temperature adjustment disk is stacked in contact with an upper portion of the fixing disk; a lower portion of a space disk is stacked in contact with an upper portion of the water temperature adjustment disk, wherein a downward elastic pressing force of a second packing provided on an inner edge of a lower end of a blocking bush provides a contacting three in a direction of the water temperature adjustment disk; a lower portion of the flow-amount/passage adjustment disk is stacked in contact with the upper portion of the fixing disk, wherein a lower portion of a flow-amount/passage adjusting member is coupled with an upper portion of the flow-amount/passage adjustment disk and a downward elastic pressing force of a third packing provided between the flow-amount/passage adjusting member and the flow-amount/passage adjustment disk provides a contacting force in a direction of the fixing disk.

4. The water valve cartridge of claim 1, wherein the fixing disk includes the cold and hot water introduction holes provided at intervals on an outer edge and the plurality of discharge holes, having equal or different angles or areas, are provided at intervals on ¾ of the central portion, except for the blocking portion.

5. The water valve cartridge of claim 1, wherein the cold and hot water introduction holes on the fixing disk are arc-shaped long holes, each extending around the circumference of the fixing disk for 90 degrees or less, and are provided at intervals on an outer circumference of the fixing disk, wherein the total sum of all the angles is 180 degrees or less, or the cold and hot water introduction holes are arc-shaped long holes each extending around the circumference of the fixing disk for an angle of 180 degrees or less, wherein the total sum of all the angles is 360 degrees or less, and the plurality of discharge holes include a first discharge hole, a second discharge hole, and a third discharge hole provided at intervals on ¾ of the central portion of the fixing disk, except for the blocking portion of the central portion.

6. The water valve cartridge of claim 1, wherein the water temperature adjustment disk is an angle-limited rotary disk provided with the water temperature adjustment hole which induces inflow of cold water, hot water, or mixed water by selectively or proportionally opening or closing either or, both of the cold and hot water introduction holes by a rotational operation in a state of being stacked on an outer edge of the upper portion of the fixing disk.

7. The water valve cartridge of claim 1, wherein the flow-amount/passage adjustment disk is an angle-unlimited rotary disk which is stacked on a center of an upper portion of the fixing disk.

* * * * *